United States Patent [19]
McElroy James F.

[11] Patent Number: 4,876,162
[45] Date of Patent: Oct. 24, 1989

[54] FUEL CELL WITH INTEGRAL CONDUIT MEANS FOR STATICALLY REMOVING LIQUID PRODUCT WATER

[75] Inventor: McElroy James F., Suffield, Conn.

[73] Assignee: United Technologies Corporation, Hartford, Conn.

[21] Appl. No.: 244,533

[22] Filed: Sep. 12, 1988

Related U.S. Application Data

[63] Continuation of Ser. No. 176,520, Apr. 1, 1988, abandoned.

[51] Int. Cl.[4] ............................................... H01M 8/04
[52] U.S. Cl. ........................................ 429/13; 429/34; 429/39
[58] Field of Search .................... 429/13, 14, 34, 38, 429/39

[56] References Cited

U.S. PATENT DOCUMENTS

| | | | |
|---|---|---|---|
| 4,0805,255 | 4/1978 | Grave et al. | 429/26 |
| 3,370,984 | 2/1968 | Platner | 136/86 |
| 3,479,224 | 11/1969 | Jager | 136/86 |
| 3,823,038 | 7/1974 | Gidaspow et al. | 136/86 |
| 4,007,058 | 2/1977 | Nelson et al. | 429/34 |
| 4,175,165 | 11/1979 | Adehart | 429/30 |
| 4,345,008 | 8/1982 | Breault | 429/26 |
| 4,463,068 | 7/1984 | Cohn et al. | 429/34 |
| 4,476,198 | 10/1984 | Ackerman et al. | 429/32 |
| 4,522,895 | 6/1985 | Shigeta et al. | 429/44 |
| 4,543,303 | 9/1985 | Dantowitz | 429/34 |
| 4,732,823 | 3/1988 | Ito et al. | 429/34 X |
| 4,735,871 | 4/1988 | Descroix et al. | 429/26 |

OTHER PUBLICATIONS

*Fuel Cells and Fuel Batteries-A Guide to Their Research and Development* by H. A. Liebhafsky and E. J. Cairns-pp. 605 and 606.

*Primary Examiner*—Anthony Skapars

[57] ABSTRACT

A fuel cell incorporating a novel water separator and withdrawal structures which comprises a porous structure allowing the passage of liquid water but denying the passage of gas incorporated within the exhaust manifold of the fuel cell.

5 Claims, 1 Drawing Sheet

FUEL CELL WITH INTEGRAL CONDUIT MEANS FOR STATICALLY REMOVING LIQUID PRODUCT WATER

DESCRIPTION

This is a continuation of application Ser. No. 176,520 filed on Apr. 1, 1988 now abandoned.

1. Technical Field

The present invention relates to electrochemical fuel cells, more particularly to electrochemical fuel cells using $H_2$ and $0_2$ as reactant gases and producing water as a reactant product.

2. Background Art

Fuel cell stacks which produce electrical current utilizing feed gases, such as an oxidant gas, i.e. oxygen ($O_2$), or air, and fuel i.e. hydrogen ($H_2$) are well known to the art. Typically these fuel cell stacks are comprised of a plurality of individual fuel cells wherein each individual fuel includes an anode chamber having a porous anode and a cathode chamber having a porous cathode separated by an electrolyte "plate" (this may be an acid, an alkali or an ion exchange membrane) contained within a fuel cell housing. Many of the fuel cell designs also contain cooling chambers between the cathode of one cell and the anode of an adjoining cell in a stack to remove the undesirable heat generated as a by-product of the reaction. All of these constituents are conventional and known to those skilled in the art.

For example, electricity may be generated in an acid ion exchange membrane fuel cell by the disassociation of hydrogen within the anode located on the surface of the electrolyte plate to form hydrogen ions and free electrons. The ions pass through the electrolyte plate to the cathode located on the opposite surface of the electrolyte plate and the free electrons pass via a suitable electron conducting means to one terminal of the fuel cell. The cathode which is similarly connected by suitable electron conducting means to the other terminal of the fuel cell draws free electrons from the other terminal to reduce the oxidant gas. This generates an electrical potential across the terminals of the fuel cell, and forms liquid water on the surface of the cathode.

The formation of liquid water at the cathode surface within the individual fuel cell can create difficulties as the liquid water formed at these surfaces tends to flood the cathode surface. This flooding blocks further contact between oxidant within the cathode chamber and with the cathode. This effect acts to impair the electrical power production of the fuel cell.

In order to alleviate the difficulty involved with the formation of liquid water on the cathode surface, several methods have been devised in order to remove this water. One such method is to insure a high volumetric flow rate of oxidant gas which, by virtue of the flow rate, acts to remove water on the surface of the cathode and to remove any entrained water within the cathode chamber. A second method of removing water is by use of a wick of fibrous material placed against the surface of the cathode. This wick which is most commonly in the form of a flat braid, collects the water droplets and water film formed on the surface of the cathode and by virtue of the capillary action of the fibers, draws off the liquid water formed in an individual fuel cell to a separate water reclamation system or a water reclamation chamber. In a third method disclosed in commonly assigned U.S. Pat. No. 4,543,303, (the contents of which are incorporated herein by reference) is a novel fuel cell structure which includes an assembly for the withdrawal of liquid water from a hydrogen/oxidant fuel cell. The fuel cell incorporates a manifold assembly which includes a wettable porous valve metal is described. Therein the individual fuel cells are oriented in a vertical orientation and connected to a common fluid exhaust manifold which includes an assembly to separate liquid water from the oxidant gas.

A fourth method disclosed in commonly assigned and copending U.S. Pat. Application No. 916,584 (the contents of which are herein incorporated by reference) is a fuel cell with integrated cooling water/static water removal means. Therein the fuel cell structure includes a hydrophobic porous material in intimate contact with the cathode and a gas/water separator associated with the cathode which is permeable to liquid water but impermeable to gases below a certain gas pressure.

However, the prior art static water removal systems have been designed to operate either in a zero gravity environment(such as space vehicles) or in fuel cells operating in a gravity field whose orientation is fixed so that the static product water removal system will operate effectively. In certain circumstances, such as on sea going vessels, fuel cells will be subject to variations in their orientation and any water removal system employed in such a fuel cell must necessarily be flexible enough to accommodate such changes. The prior art is deemed to be inadequate in teaching such a water removal system.

Therefore, what is needed in this art is a static water removal system for fuel cells which will operate under a variety of positions.

DISCLOSURE OF THE INVENTION

One object of the invention is to provide an improved fuel cell, one with an integral conduit means for statically removing liquid product water from a fuel cell.

Another object of the invention is to provide a fuel cell which includes an exhaust manifold containing a conduit structure capable of restricting the passage of gas while permitting the passage of liquid therethrough.

A still further object of the invention is to provide a novel method of removing liquid from a fuel cell cathode chamber.

These and other objects of the invention are realized by a fuel cell device which comprises an anode, an electrolyte, a cathode and a cathode chamber and an exhaust manifold wherein a wick is positioned at the base of the cathode chamber and extends substantially along the width of the cathode to the exhaust manifold. The exhaust manifold contains a conduit structure which is permeable to liquid but impermeable to gas at gas pressures below the "bubble pressure, P" of the conduit structure where the "bubble pressure, P" is related to the pore size of the structure by the relationship $$P = \frac{2(\text{surface tension})}{(\text{pore radius for nominally circular pores})}$$

Other features and advantages of this invention will become more apparent from this specification and from the claims and the accompanying drawings which illustrate several embodiments thereof.

BEST MODE FOR CARRYING OUT THE INVENTION

In the accompanying drawings, one exemplary embodiment of the present invention is illustrated, but it is to be understood that fuel cells and fuel cell stacks incorporating other configurations and geometries other than the one illustrated here may enjoy the benefits of the present invention.

Figure 1:
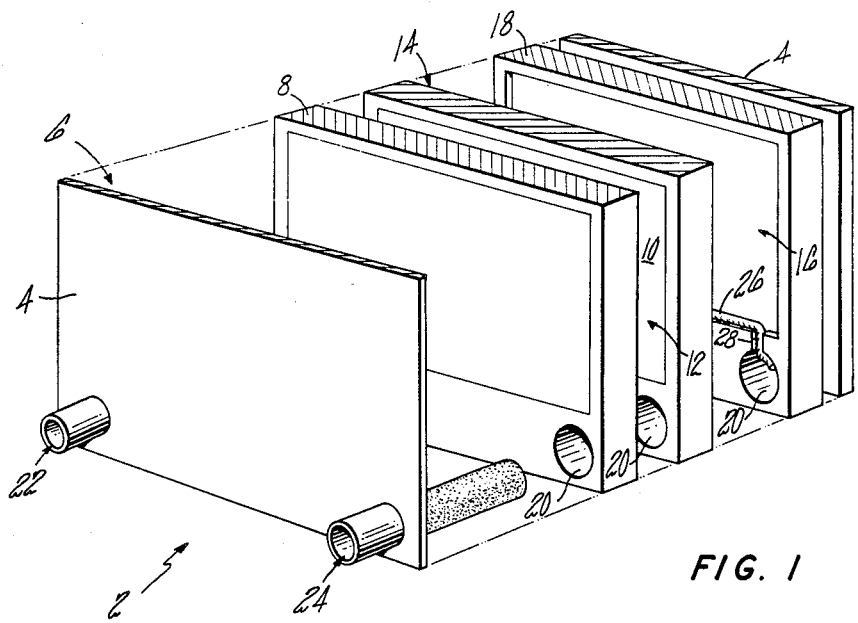
FIG. 1 shows a partial, exploded view of an individual fuel cell according to the present invention.

Turning now to FIG. 1, a fuel cell 2 used for generating electrical current by conversion of $H_2$ and $O_2$ gases, is shown, and is comprised of a series of parallel, coplanar plates layered in register, or "stacked" as illustrated. Looking to the exploded view of FIG. 1, the fuel cell 2 includes a barrier plate 4, an anode chamber 6 surrounded and enclosed by an anode chamber frame 8, an anode 10, an electrolyte 12, a cathode 14, and a cathode chamber 16, enclosed by a cathode chamber frame 18. Additionally shown in the exploded view is an exhaust manifold 20 which is comprised of individual passages 20 within each of the aforementioned plates and frames which, when layered in register of "stacked", form a continuous passage. Additionally, partially shown is a portion of a wick structure 26 which is directed into the exhaust manifold 20 via a wick passage 28 which connects the cathode chamber 16 with the exhaust manifold 20. A similar wick passage 30 (FIG. 2) is provided to connect the cathode chamber 16 with the other exhaust manifold 20.

The wick structures 26 are positioned at the base of the cathode chamber frame 18 such that the water generated at the cathode is directed by gravity to the base of the cathode and comes in contact with the wick structure 26. The water is then drawn by capillary action through the wick structure 26 to the exhaust manifold 20. These wick structures 26 may be formed of non electrically conductive material. Typically this will be some form of woven or knitted material such as a natural fabric (cotton, wool, etc.) or a man made material (such as nylon, rayon, Dacron, etc.) or even a porous ceramic material. Many of these materials are conventional wicking compositions and would be well known. The fuel cell as shown contains two exhaust manifolds, however, it is contemplated that the invention can be operated with a single exhaust manifold. Also the position of the exhaust manifold within the cathode chamber may be other than that depicted.

Naturally, when operated in this configuration it would be necessary to have the manifold pressurized to a pressure sufficient to prevent the oxidant from freely flowing out the exhaust manifold along with the water. The manner in which this would be accomplished would be known to those skilled in the art and may be done by using a pump to pressurize the manifold or by sealing the manifold so that the oxidant could not escape while supplying a receptacle for the water such as a sump (not shown).

Shown passing through each of the aforementioned plates and frames are two conduit structures 22 and 24 according to the present invention. The conduit structures 22, and 24 are positioned within the exhaust manifold 20. These conduit structures 22, 24 are dimensioned to have an external diameter or "D" smaller than that of the exhaust manifold 2 so as to allow for the placement of the conduit structure 22, 24 within the respective exhaust manifold 20.

As shown in FIG. 1, these conduit structures 22, 24 are tubes or pipes with circular cross sections and their corresponding manifolds 20, are also circular. However, it is to be understood that any other geometry or configuration may be adapted to the particular needs of the fuel cell without detracting from the invention.

The conduit structures 22, 24 contain "pores" or passages which pass between the outer conduit structure wall 22o, 24o and the inner conduit wall 22i, 24i of the respective conduit structure 22, 24.

The presence of the above-described passages or pores within the conduit structures 22, 24 permit the passage of liquid water but prevents the passage of a gas through the pores below a certain critical pressure differential across the outer and inner conduit walls of the conduit structures 22, 24 whenever the conduit structures are "wetted". What is to be understood by the term "wetted" is that the conduit structures contain a sufficient amount of water so as to assure that the pores passing through the conduit structure contain liquid water. Normally, this requirement is readily satisfied by the presence of even a minimal amount of water within the conduit structure 22, 24 or upon the exterior of the conduit structure 22, 24 and the presence of liquid water being conducted out of the fuel cell 2 via the conduit structure assures the satisfaction of this requirement. Customarily, the critical pressure differential across the outer and inner conduit is defined as the "bubble pressure, P". The "bubble pressure, P" is related to the pore size of the conduit structures 22, 24 by the relationship $$P = \frac{2(\text{surface tension})}{(\text{pore radius for nominally circular pores})}$$

According to the terms of this relationship, the average nominal circular pore diameter of the conduit structure should be selected so that a bubble pressure of approximately 3 psi is established as the differential pressure between the pressure within the exhaust manifold 20 and the pressure within the interior of the conduit structures 22i, 24i. This will assure that gas will not pass out the exhaust manifold 20 (which communicates with the cathode chamber 16 via the wick passage 28,30) into the conduit structures 22, 24 but will only pass liquid water formed in the fuel cell cathode 14 into the conduit means 22, 24.

The conduit means 22, 24 may be fabricated from any material which may be made to contain suitable pores and withstand the operating conditions of the fuel cell. Preferable this material is a sintered ceramic or glass which has a low dielectric strength and thus reduces the likelihood of an electrical short across several of the individual fuel cells. Alternatively, this material may be a metal such as tantalum, titanium, niobium or zirconium which is insulated from electrical contact with the exhaust manifold. Of these materials, a tube comprised of sintered niobium is preferred as the niobium exhibits satisfactory degradation characteristics within the operating environment of a hydrogen/oxygen fuel cell.

In the operation of the fuel cell 2 illustrated in FIG. 1, hydrogen gas is introduced into the anode chamber 6 from a suitable gas supply means such as a gas manifold (not shown). There the H₂ contacts the anode 8 where it disassociates into free electrons and hydrogen ions. The ions produced at the anode 10 pass through the electrolyte 12 to the cathode 14 which is exposed to the cathode chamber 16. The cathode chamber 16 is supplied with oxygen gas through the cathode gas inlet port (not shown) from a suitable gas supply means such as a gas manifold (not shown). The oxygen contacts the cathode 14 and reacts with the hydrogen ions to form liquid water, H₂O, on the cathode surface which, ideally, falls in the direction of the exhaust manifolds 20 and contacts the outer conduit structure wall 22o, 24o, and passes into the interior of the conduit structure 22, 24 and from there may be drawn out of the fuel cell 2. Liquid water is withdrawn out of the fuel cell device by any means known to the art including by the method of maintaining a pressure differential across the feed gas supply means (not shown) and the interior of the conduit means 22, 24 which would force liquid water from the cell. In the alternative a pump, vacuum or suction means may be used, and in communication with the conduit structures 22, 24 be used to withdraw liquid from the fuel cell 2.

Figure 2:
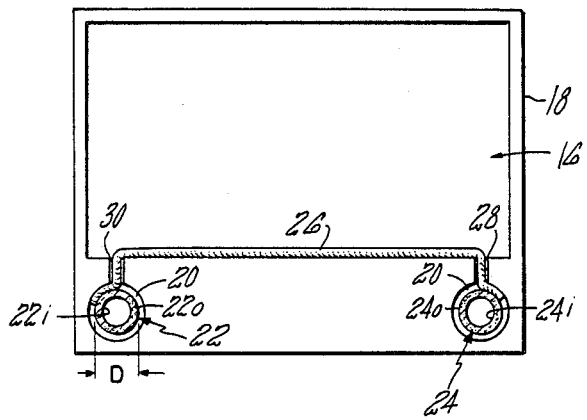
FIG. 2 shows a frontal view of the cathode chamber including the wick structure, the conduit structure and the exhaust manifold according to the present invention.

Looking now to FIG. 2, a frontal view of a cathode chamber 16, including a cathode chamber frame 18 and a cross-sectional view of the conduit structures 22, 24 and of the exhaust manifolds 20 is shown. Also shown is a wick structure 26 placed within the cathode chamber frame 18 extending via two wick passages 28,30 into the exhaust manifolds 20, and physically contacting the outer wall of the conduit structure 22o, 24o. The wick structure 16 acts to collect liquid water within the cathode chamber 16 and, due to the capillary nature of the fibers within the wick structure 26, collect liquid water and conduct it to one of the two conduit structures 22, 24 from where the liquid water may be withdrawn. Such a wick structure 26 is an effective complement to the conduit structure 22, 24 and accelerates the rate at which liquid water may be collected, channelled and ultimately withdrawn from the fuel cell structure.

Figure 3:
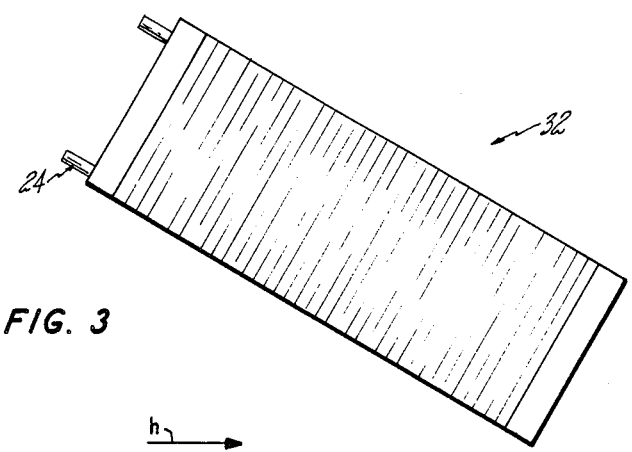
FIG. 3 illustrates a fuel cell stack in an "adverse orientation" with reference to a line segment "h" representing the horizontal plane.

Looking now to FIG. 3, the fuel cell device 32 depicted here is oriented so that the central axis of the conduit structures 22, 24 are noncoplanar with the horizontal plane illustrated by the line labeled "h". In this position, the fuel cell apparatus 32 is susceptible to "flooding" a condition where liquid water formed within the fuel cell apparatus 32 is not withdrawn at a satisfactory rate resulting in the blockage of cathode chambers and flooding of the exhaust manifold. This condition is very undesirable as such flooding denies the passage of oxygen gas through the cathode chamber and thus greatly reduces the electrical current production of such a fuel cell device. According to the present invention, the nature of the conduit structures 22, 24 allows for the effective separation of gas and liquid water directly at the conduit structure, thus greatly accelerating the removal of liquid water from the fuel cell apparatus 32 and avoiding the undesirable condition known as flooding. In addition, the structure of the conduit structures 22, 24 are in the form of a tube as this allows for the rapid withdrawal of liquid and eliminates the possibility of "flooding the manifold" a condition where liquid water may not be withdrawn quickly enough from the fuel cell device 32. By use of the present invention, the risk of flooding of the fuel cell device 32 is eliminated by both assuring the separation of liquid water at the exhaust manifold 20, and simultaneously providing a means for directing the exit of liquid water from the fuel cell device 32 which is accomplished by each of the individual conduit structures 22, 24, and heretofore unavailable in the prior art.

The invention has been disclosed as operating with a conduit of a porous material positioned within the manifold. The conduits presence enhances the removal of the static water by acting as a wick to draw the material out of the fuel cell or stack even against the influences of gravity when the stack is in the attitude shown in FIG. 3. However, it is also contemplated that the manifold could be used to collect the water from the wick material and using the forces of gravity, direct the water through the manifold out of the fuel cell or stack. This configuration would not require the additional porous conduit as the water would merely exit the fuel cell or stack under the influence of gravity. However, such a configuration would result in a fuel cell or stack which, in order to operate, would need to be in an attitude where the exit of the manifold was positioned below the horizontal. An additional feature when using this configuration would be to pass the manifold through both ends of the fuel cell or stack. This would allow the water to exit the cell or stack through the manifold when the cell or stack was positioned on either side of the horizontal plane offering additional versatility for end uses.

The present invention will allow for static removal of product water when the fuel cell is in the horizontal as well as when it's position is altered to less than horizontal. The angles at which a fuel cell will operate will depend on the design and placement of the wick. However the critical feature is that the product water must be able to contact the wick so that it might be drawn into the conduit and removed.

Although the invention has been shown and described with respect to detailed embodiments thereof, it will be understood by those skilled in the art that various changes in form and detail thereof may be made without departing from the spirit and scope of the invention.

I claim:

1. A fuel cell comprising an anode, an electrolyte, a cathode, a cathode chamber and a means for removing static product water from the cathode chamber characterized in that the means for static product water removal comprises a wick positioned at the base of and extending at least substantially the entire length of the cathode chamber, said wick being in contact with at least one exhaust manifold structure exiting the cathode chamber wherein said manifold structure contains a conduit structure which is permeable to liquid but impermeable to gas at gas pressures below the "bubble pressure, P" of the conduit structure where the "bubble pressure, P" is related to the pore size of the structure by the relationship $$P = \frac{2 \text{ (surface tension)}}{\text{(pore radius for nominally circular pores)}}$$

2. A fuel cell as in claim 1 wherein the conduit structure has a circular cross section.

3. A fuel cell as in claim 1 wherein the conduit structure is fabricated from the sintered glass.

4. A fuel cell as in claim 1 wherein the conduit structure is fabricated from a valve metal.

5. A method of removing static product water from a fuel cell having at least one anode, an electrolyte, one cathode and one cathode chamber comprising:
   directing the static product water to the base of the cathode chamber;
   contacting the static product water with a wick which is positioned at the base of the cathode chamber;
   absorbing the water onto said said wick and transporting by capillary action through said wick to an exhaust manifold wherein the exhaust manifold contains a conduit structure which is permeable to liquid but impermeable to gas at gas pressure below the ∂bubble pressure, P" of the conduit structure wherein the "bubble pressure, P" is related to the pore size of the structure by the relationship $$P = \frac{2 \text{ (surface tension)}}{\text{(pore radius for nominally circular pores)}}$$

and said wick is in contact with said conduit structure such that the water in the wick is desorbed from the wick to the conduit structure by capillary action and drawn out of the cathode chamber; and removing the static product water from the cathode chamber through the manifold.

* * * * *